A. E. BEALL & C. F. SKELLENGER.
VEHICLE WHEEL.
APPLICATION FILED JUNE 29, 1908.
933,049.
Patented Sept. 7, 1909.
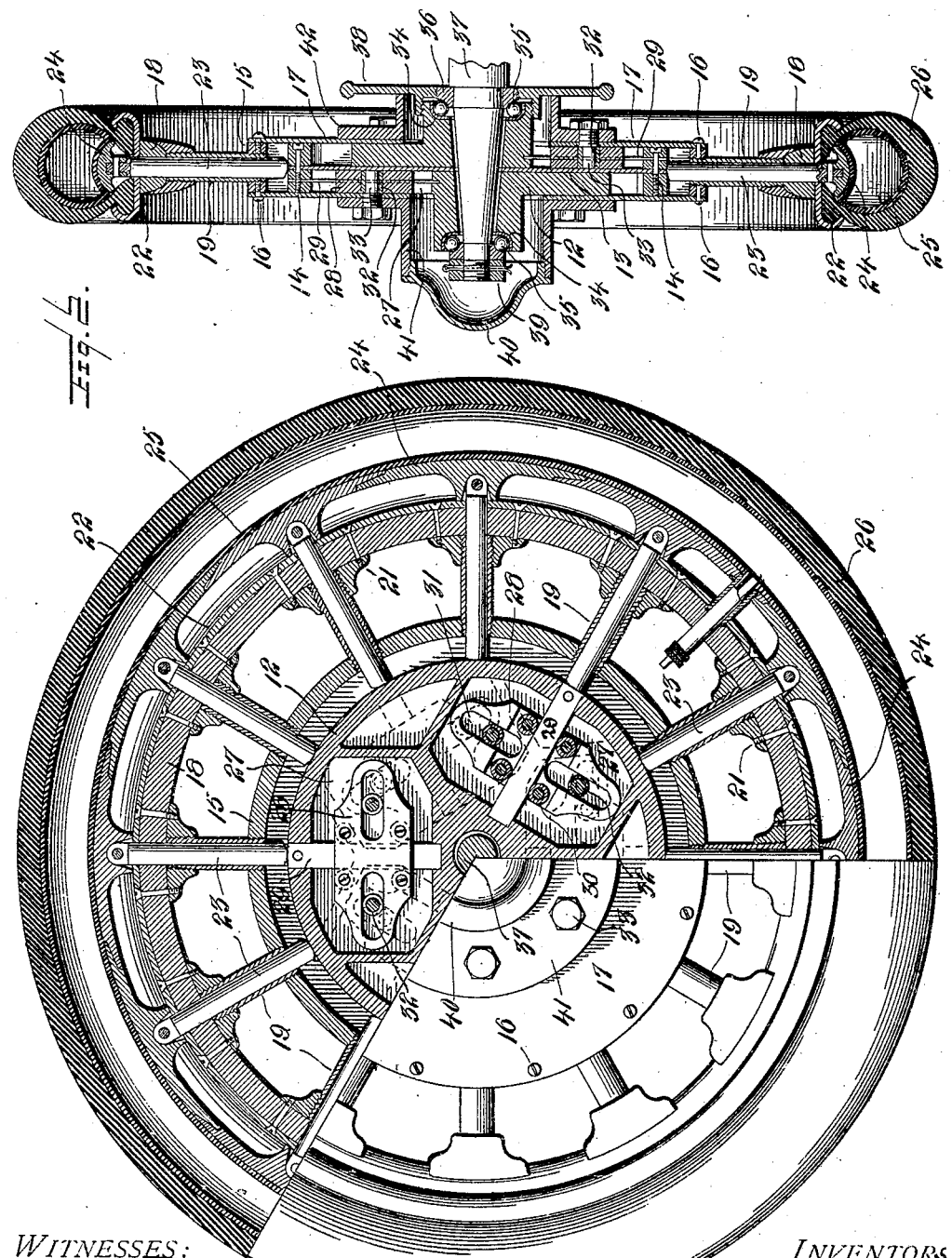
WITNESSES:
INVENTORS.
Albert E. Beall
Charles F. Skellenger,
BY
Attorneys.

UNITED STATES PATENT OFFICE.

ALBERT E. BEALL AND CHARLES F. SKELLENGER, OF CLINTON, IOWA.

VEHICLE-WHEEL.

933,049.  Specification of Letters Patent.  Patented Sept. 7, 1909.

Application filed June 29, 1908. Serial No. 440,850.

*To all whom it may concern:*

Be it known that we, ALBERT E. BEALL and CHARLES F. SKELLENGER, both citizens of the United States, residing at Clinton, in the county of Clinton and State of Iowa, have invented or discovered certain new and useful Improvements in Vehicle-Wheels, of which the following is a specification, reference being had therein to the accompanying drawings.

This invention relates to wheels for automobiles or other vehicles, and has for its object to provide a wheel, having a pneumatic tire, which will be of such construction as will obviate a difficulty occurring with pneumatic tire wheels now in use caused by the chafing of the tire at its points of attachment to the rim of the wheel, and a consequent abrasion and wear of the tire at these points, so that the tire is likely to break or give away. Such abrasion or wear results largely from the fact that the weight of the vehicle comes directly on the outer tire which is flattened more or less in sustaining such weight, and there is therefore a constant rubbing action between the tire and the rim of the wheel when the vehicle is in motion.

The invention is carried into effect by providing a wheel of such construction that the desired resilience is obtained from the inner tube of the tire. This result is preferably effected by providing, between the inner tube of the tire and the rim of the wheel, a series of plates or members which bear against the inner tire and which sustain the weight to be borne, such pressure members being suitably connected with the hub of the wheel so that when the wheel is running the said hub will be free to oscillate more or less to provide the desired yielding or resilient movements. With this construction a suitably resilient wheel, with a very heavy non-puncturable outer tire, may be provided; as the outer tire is not depended upon for obtaining the desired resilience.

In the accompanying drawings, Figure 1 is a side view, partly in section and partly in elevation, of a wheel embodying the invention. Fig. 2 is a diametric section of the same.

Referring to the drawings, the hub of the wheel comprises two recessed or skeleton parts or sections 12, which will preferably be of cast or malleable metal, and between which is preferably interposed a thin metallic plate 13, these parts being suitably secured together, as by screws 14. Encircling the hub of the wheel is a metallic ring 15 to which are attached, in any suitable manner, as by screws 16, side plates 17. The wheel will preferably comprise a wooden rim 18 connected with the ring 15 by means of metallic sleeves or tubular spokes 19 screwed into said ring and into lugs or thimbles suitably attached to the said rim, as by screws 21, said screws also serving to secure the metal rim 22 to the said wooden rim 18. The tubular spokes 19 receive a series of radially movable sliding pins 23 the inner ends of which abut against the periphery of the hub of the wheel and to the outer ends of which sliding pins are pivoted the pressure plates 24 which preferably overlap each other as shown; and which bear directly against the inner tube 25 of the pneumatic tire, said inner tube being surrounded, in the usual manner with double tube tires, by the outer tube 26 which is suitably secured to the metal rim 22. Each of the hub sections 12 is provided with three recesses 27 each of which receives a slide 28 preferably consisting of two plates suitably secured together and embracing a flat radial bar 29 against which bear anti-friction rolls 30 interposed between and carried by said plates. The recesses 27 in one hub section 12 are not placed opposite the similar recesses in the other hub section, but these recesses are so arranged that they will alternate so that the recesses of one hub section will come between the recesses of the other hub sections, and thus the slides and the radial bars 29 on which the said slides are intended to have limited radial movements will be so arranged as to alternate with each other. Each of the slides 28 is provided with two slots 31 which receive anti-friction rolls 32 carried by bolts or pins 33 suitably mounted on the side plates 17, this construction permitting of certain limited movements of the said slides relative to the hub sections, so that the hub of the wheel may move or oscillate more or less when the vehicle is running.

To provide a wheel with dust-proof ball-bearings, the hub sections 12 are suitably recessed at their central parts for the reception of cups 34 to receive anti-friction balls 35 which will be held in place in any suitable or well-known manner, as by rings 36 encircling the wheel axle 37, one of said rings being mounted in the dust-excluding plate 38 and the other being held in place by nuts 39 screwed on to the end of the said axle. The outer side of the wheel hub is closed by a dust cap 40 preferably screwed to a housing member 41 attached to one of the side plates 17 by the screw bolts 33, a similar housing 42 being also held in place by screw bolts 33 on the opposite side plate of the wheel.

From the foregoing it will be understood that the weight coming on the wheel will be borne by the inner tube 25 of the tire, said inner tube being, of course, made of suitable strength to withstand what little wear will come upon the same by the action of the pivoted pressure plates 24. The invention therefore provides a pneumatic tire wheel in which a much greater resilience can be obtained from a pneumatic tire of a given stiffness or strength than is possible where the resilience is obtained from the outer tube of the pneumatic tire; and the invention also provides a construction which will render the pneumatic tire more durable in that it will be subjected to much less wear than where the resilience is obtained directly from the outer tube, in that abrasion of the outer tire against the wheel rim is largely avoided.

Having thus described our invention we claim and desire to secure by Letters Patent:

1. A vehicle wheel comprising a pneumatic tire having elastic inner and outer tubes, the former inclosed within the latter, and a hub, in combination with a series of pressure plates connected with said hub and bearing directly on the said inner tube, so that the resilience of the wheel will be obtainable from said inner tube.

2. A vehicle wheel comprising a pneumatic tire having elastic inner and outer tubes, the former inclosed within the latter, and a hub, in combination with a series of pivoted and overlapping pressure plates connected with said hub and bearing directly on the said inner tube, so that the resilience of the wheel will be obtainable from said inner tube.

3. In a vehicle wheel, the combination with a pneumatic tire comprising elastic inner and outer tubes, the former inclosed within the latter, of a hub, a ring connected with and encircling said hub, a rim encircling said ring, a series of tubular spokes connecting said ring and rim, a series of pressure plates bearing directly on said inner tube, and a series of radially movable sliding pins passing through said tubular spokes and to the outer ends of which said pressure plates are attached, and which pins abut at their inner ends against said hub.

4. In a vehicle wheel, the combination with a pneumatic tire comprising elastic inner and outer tubes, the former inclosed within the latter, of a hub, a ring connected with and encircling said hub, a rim encircling said ring, a series of tubular spokes connecting said ring and rim, a series of overlapping pressure plates bearing directly on said inner tube, and a series of radially movable sliding pins passing through said tubular spokes and to the outer ends of which said pressure plates are pivoted, and which pins abut at their inner ends against said hub.

5. In a vehicle wheel, the combination of a hub composed of two sections each provided with recesses, radial bars in said recesses, roller-bearing slides also in said recesses and movable on said bars, said slides being provided with slots, pins extending into said slots and provided with anti-friction rolls, side-plates by which said pins are carried, a ring encircling said hub and to which said side plates are attached, a pneumatic tire having inner and outer tubes, a series of pressure plates bearing directly on said inner tube and a series of sliding pins abutting against said hub and connected with said pressure plates.

6. In a vehicle wheel, the combination of a hub composed of two sections each provided with recesses, radial bars in said recesses, roller-bearing slides also in said recesses and movable on said bars, said slides being provided with slots, pins extending into said slots and provided with anti-friction rolls, side-plates by which said pins are carried, a ring encircling said hub and to which said side plates are attached, a pneumatic tire having inner and outer tubes, a series of pivoted and overlapping pressure plates bearing directly on said inner tube, and bracing connections between said pressure plates and said hub.

7. In a vehicle wheel, the combination with an oscillating hub composed of two recessed sections, of radially-movable roller-bearing slides arranged in the recesses of said sections, a ring encircling said hub, side plates by which said ring is connected with said hub, pins carried by said side-plates and engaging said slides, a rim encircling said ring, means for connecting said rim and ring, a pneumatic tire comprising inner and outer tubes, and a series of pressure plates bearing directly against said inner tube and connected with said hub and serving to transmit the weight borne by the latter to said inner tire; whereby the resilience of the wheel is obtainable directly from said inner tire and wear and abrasion of the outer tire against the rim are largely avoided.

8. In a vehicle wheel, the combination with an oscillating hub composed of two recessed sections, of radially movable roller-bearing slides arranged in the recesses of said sections, a ring encircling said hub, side plates by which said ring is connected with said hub, pins carried by said side-plates and engaging said slides, a rim encircling said ring, a pneumatic tire comprising inner and outer tubes, and a series of pressure plates bearing directly against said inner tube, tubular spokes connecting said ring and rim, sliding pins abutting at their inner ends against said hub and radially movable in said spokes, and to the outer ends of which pins said pressure plates are pivoted; whereby the resilience of the wheel is obtainable directly from said inner tire and wear and abrasion of the outer tire against the rim are largely avoided.

In testimony whereof we affix our signatures, in presence of two witnesses.

ALBERT E. BEALL.
CHARLES F. SKELLENGER.

Witnesses as to signature of Albert E. Beall:
J. A. SAWYER,
R. F. ANDERSON.

Witnesses to signature of Charles F. Skellenger:
A. H. PADDOCK,
H. S. WILSON.